US012152611B2

(12) United States Patent
Cho

(10) Patent No.: US 12,152,611 B2
(45) Date of Patent: Nov. 26, 2024

(54) HYDRAULIC SYSTEM

(71) Applicant: HD Hyundai Infracore Co., Ltd., Incheon (KR)

(72) Inventor: Yong Lak Cho, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 0 days.

(21) Appl. No.: 18/265,134

(22) PCT Filed: Nov. 29, 2021

(86) PCT No.: PCT/KR2021/017774
§ 371 (c)(1),
(2) Date: Jun. 2, 2023

(87) PCT Pub. No.: WO2022/119257
PCT Pub. Date: Jun. 9, 2022

(65) Prior Publication Data
US 2024/0110581 A1 Apr. 4, 2024

(30) Foreign Application Priority Data
Dec. 3, 2020 (KR) ........................ 10-2020-0167773

(51) Int. Cl.
*F04B 49/08* (2006.01)
*E02F 9/22* (2006.01)
(Continued)

(52) U.S. Cl.
CPC .......... *F15B 13/042* (2013.01); *E02F 9/2278* (2013.01); *F04B 49/08* (2013.01);
(Continued)

(58) Field of Classification Search
CPC ........... F15B 11/165; F15B 2211/6333; F04B 49/08; F04B 2201/12041; F04B 2201/12051
See application file for complete search history.

(56) References Cited

U.S. PATENT DOCUMENTS 4,559,778 A * 12/1985 Krusche ................ F16H 61/472 60/449
5,421,155 A * 6/1995 Hirata .................... B01D 53/28 60/494
(Continued)

FOREIGN PATENT DOCUMENTS

EP 0 614 016 B1 7/1999
EP 0 773 370 B1 6/2003
(Continued)

OTHER PUBLICATIONS

International Search Report issued on Mar. 15, 2022, for corresponding International Patent Application No. PCT/KR2021/017774, along with an English translation (7 pages).
(Continued)

*Primary Examiner* — Michael Leslie
(74) *Attorney, Agent, or Firm* — Hauptman Ham, LLP

(57) ABSTRACT

A hydraulic system comprises: a hydraulic pump that includes an swash plate; an swash plate angle sensor for measuring the angle of the swash plate; an swash plate driving piston for moving the swash plate of the hydraulic pump in response to changes in pressure applied to a large diameter section; an swash plate control hydraulic line for supplying the large diameter section with a portion of the hydraulic oil discharged by the hydraulic pump; a control valve that controls the flow rate of the hydraulic oil that is following into and out of the large diameter section; an electro-proportional pressure reducing valve for producing pilot pressure that is to be transmitted to one side of the control valve; and a control device for controlling the electro-proportional pressure reducing valve according to an operation signal of an operation device and the angle information from the swash plate angle sensor.

10 Claims, 3 Drawing Sheets

(51) Int. Cl.

| | |
|---|---|
| ***F15B 13/04*** | (2006.01) |
| ***F15B 13/042*** | (2006.01) |
| ***F15B 21/00*** | (2006.01) |

(52) U.S. Cl.

CPC ............ *F15B 13/04* (2013.01); *F15B 21/001* (2013.01); *F04B 2201/12041* (2013.01); *F04B 2201/12051* (2013.01); *F15B 2211/6333* (2013.01); *F15B 2211/6652* (2013.01)

(56) References Cited

U.S. PATENT DOCUMENTS

| | | | | |
|---|---|---|---|---|
| 6,651,428 | B2 * | 11/2003 | Takahashi ............. | E02F 9/2203 60/447 |
| 7,048,515 | B2 * | 5/2006 | Shimomura .......... | F04B 49/065 417/279 |
| 8,424,298 | B2 * | 4/2013 | Ariga .................... | E02F 9/2225 60/329 |
| 2003/0156949 | A1 | 8/2003 | Shimomura et al. | |
| 2014/0366518 | A1 | 12/2014 | Bang | |

FOREIGN PATENT DOCUMENTS

| | | | |
|---|---|---|---|
| JP | 2011-1162 | A | 1/2011 |
| JP | 2020-169647 | A | 10/2020 |
| KR | 10-2014-0002296 | A | 1/2014 |
| KR | 10-1922219 | B1 | 11/2018 |
| KR | 10-2020-0076417 | A | 6/2020 |

OTHER PUBLICATIONS

Written Opinion issued on Mar. 15, 2022, for corresponding International Patent Application No. PCT/KR2021/017774 (4 pages).

Extended European Search Report dated Jul. 19, 2024 in connection with the corresponding European Patent Application No. 21900945.3, 10 pages.

* cited by examiner

HYDRAULIC SYSTEM

CROSS REFERENCE TO RELATED APPLICATION

The present application is a national stage filing under 35 U.S.C § 371 of PCT application number PCT/KR2021/017774 filed on Nov. 29, 2021, which is based upon and claims the benefit of priority to Korean Patent Application No. 10-2020-0167773, filed on Dec. 3, 2020, in the Korean Intellectual Property Office. All of the aforementioned applications are incorporated herein by reference in their entireties.

TECHNICAL FIELD

The present invention relates to a hydraulic system, and more specifically, to a hydraulic system that improves efficiency of a swash plate type variable displacement hydraulic pump.

BACKGROUND ART

In general, a hydraulic system transmits power through hydraulic oil discharged by a hydraulic pump to operate various drive devices. Such a hydraulic system is widely used in construction machinery, industrial vehicles, or the like. For example, a hydraulic system that is used in construction machinery drives a number of work devices such as a boom, an arm, a bucket, a travel motor, and a slewing motor through the hydraulic oil discharged from the hydraulic pump that is driven by an engine.

In a swash plate type variable displacement hydraulic pump, which is a kind of hydraulic pump used in such a hydraulic system, a discharge flow rate is controlled by adjusting an angle of a swash plate formed in the pump through a flow rate control device such as a regulator.

Such a hydraulic control device can be divided into a mechanical control method and an electronic control method. In the past, the mechanical control method was mainly used, but in recent years, the electronic control method has been widely used. The electronically controlled hydraulic control device controls a swash plate angle by applying an electrical signal to the regulator. The electronically controlled hydraulic control device controls a pressure-controlled electronic hydraulic pump. The pressure-controlled electronic hydraulic pump is controlled through a control device, which receives an operation signal from an operation device installed in a driver seat of a construction machine and an angle value of a swash plate from an angle sensor mounted in the electronic hydraulic pump, as electrical signals, respectively, and outputs an electrical signal for pressure control to the electronic hydraulic pump.

In addition, the flow rate control device such as a regulator controls an operation of a swash plate drive piston through a control valve to adjust an angle of the swash plate of the hydraulic pump. The control valve selectively supplies a portion of the hydraulic oil discharged from the hydraulic pump to the swash plate drive piston to control the operation of the swash plate drive piston.

However, while the control valve controls the operation of the swash plate drive piston, a portion of the hydraulic oil discharged from the hydraulic pump is drained from the control valve and discarded. The draining of the hydraulic oil from the control valve is required for the control valve to stably perform the control operation.

However, since the hydraulic oil discharged from the hydraulic pump is discarded as much as the hydraulic oil is drained from the control valve, there occurs a problem that the hydraulic oil with a flow rate less than the maximum flow rate of hydraulic oil that can be actually discharged by the hydraulic pump is used to drive various drive devices. In addition, since the maximum volume of the hydraulic pump is limited, such a problem leads to a decrease in performance of equipment using the hydraulic system.

DISCLOSURE

Technical Problem

An exemplary embodiment of the present disclosure provides a hydraulic system capable of minimizing unnecessary flow rate loss.

Technical Solution

An exemplary embodiment of the present disclosure provides a hydraulic system including: a variable displacement hydraulic pump configured to discharge hydraulic oil and including a swash plate; a swash plate angle sensor configured to measure an angle of the swash plate; a swash plate drive piston having a large diameter section and a small diameter section and configured to move the swash plate of the hydraulic pump in response to a change in pressure applied to the large diameter section; a swash plate control hydraulic line for supplying a portion of the hydraulic oil discharged by the hydraulic pump to the large diameter section; a control valve installed on the swash plate control hydraulic line to control a flow rate of the hydraulic oil supplied to or discharged from the large diameter section; an electronic proportional pressure reducing valve (EPPRV) configured to generate pilot pressure that is to be delivered to one side of the control valve; an operation device configured to generate an operation signal; and a control device configured to control the electronic proportional pressure reducing valve according to an operation signal from the operation device and angle information from the swash plate angle sensor.

The hydraulic system may further include a drain line connected to the control valve, and a valve control hydraulic line branched from the swash plate control hydraulic line upstream of the control valve and provided to deliver pressure to the other side of the control valve.

The pilot pressure generated by the electronic proportional pressure reducing valve under control of the control device and delivered to one side of the control valve may include a first pilot pressure lower than the pressure applied to the other side of the control valve through the valve control hydraulic line, a second pilot pressure higher than the pressure applied to the other side of the control valve through the valve control hydraulic line, and a third pilot pressure higher than the second pilot pressure.

When the first pilot pressure is applied to one side of the control valve, the control valve may be configured to supply the hydraulic oil to the large diameter section of the swash plate drive piston through the swash plate control hydraulic line. When the second pilot pressure is applied to one side of the control valve, the control valve may be configured to drain the hydraulic oil of the large diameter section of the swash plate drive piston to the drain line. When the third pilot pressure is applied to one side of the control valve, the draining of the hydraulic oil from the control valve to the drain line may be cut off.

When the first pilot pressure and the second pilot pressure are applied to one side of the control valve, at least a portion of the hydraulic oil discharged from the hydraulic pump and delivered to the control valve through the swash plate control hydraulic line and the valve control hydraulic line may be drained through the drain line.

When the hydraulic oil is supplied to the large diameter section of the swash plate drive piston, the angle of the swash plate of the hydraulic pump may be reduced to reduce the discharge flow rate of the hydraulic pump, and when the hydraulic oil is drained from the large diameter section of the swash plate drive piston, the angle of the swash plate of the hydraulic pump may be increased to increase the discharge flow rate of the hydraulic pump.

The control device may be configured to control the electronic proportional pressure reducing valve to generate the third pilot pressure when the angle of the swash plate measured by the swash plate angle sensor becomes equal to or greater than a preset angle after the second pilot pressure is applied to one side of the control valve.

The control device may be configured to control the electronic proportional pressure reducing valve to generate the third pilot pressure when the operation signal of the operation device requests the maximum flow rate discharge of the hydraulic pump after the second pilot pressure is applied to one side of the control valve and the hydraulic oil is drained to the maximum extent from the large diameter section of the swash plate drive piston.

The control device may be configured to calculate the pilot pressure required according to a flow rate control method, the pilot pressure required according to a horsepower control method, and the pilot pressure required according to a pressure control method, respectively. The control device may be configured to select the lowest pilot pressure among the calculated pilot pressures and to control the electronic proportional pressure reducing valve to generate the selected pilot pressure.

The control device may be configured to control the electronic proportional pressure reducing valve to generate the third pilot pressure when the pilot pressure required according to the flow rate control method is lower than the pilot pressure required according to the horsepower control method and the pilot pressure required according to the pressure control method.

Another exemplary embodiment of the present disclosure provides a hydraulic system including: a variable displacement hydraulic pump configured to discharge hydraulic oil and including a swash plate; a swash plate drive piston having a large diameter section and a small diameter section and configured to move the swash plate of the hydraulic pump in response to a change in pressure applied to the large diameter section; a swash plate control hydraulic line for supplying a portion of the hydraulic oil discharged by the hydraulic pump to the large diameter section; a control valve installed on the swash plate control hydraulic line to control a flow rate of the hydraulic oil supplied to or discharged from the large diameter section; an electronic proportional pressure reducing valve (EPPRV) configured to generate pilot pressure that is to be delivered to one side of the control valve; an operation device configured to generate an operation signal; and a control device configured to control the electronic proportional pressure reducing valve to generate a third pilot pressure for cutting off draining of the hydraulic oil from the large diameter section to an oil tank when an operation signal of the operation device requires the maximum discharge flow rate of the hydraulic pump.

The hydraulic system may further include a swash plate angle sensor configured to measure an angle of the swash plate, and the control device may be configured to control the electronic proportional pressure reducing valve to generate the third pilot pressure when the angle of the swash plate measured by the swash plate angle sensor becomes equal to or greater than a preset angle.

Advantageous Effects

According to the exemplary embodiments of the present disclosure, the hydraulic system can minimize unnecessary flow rate loss.

BEST MODE

Figure 1:
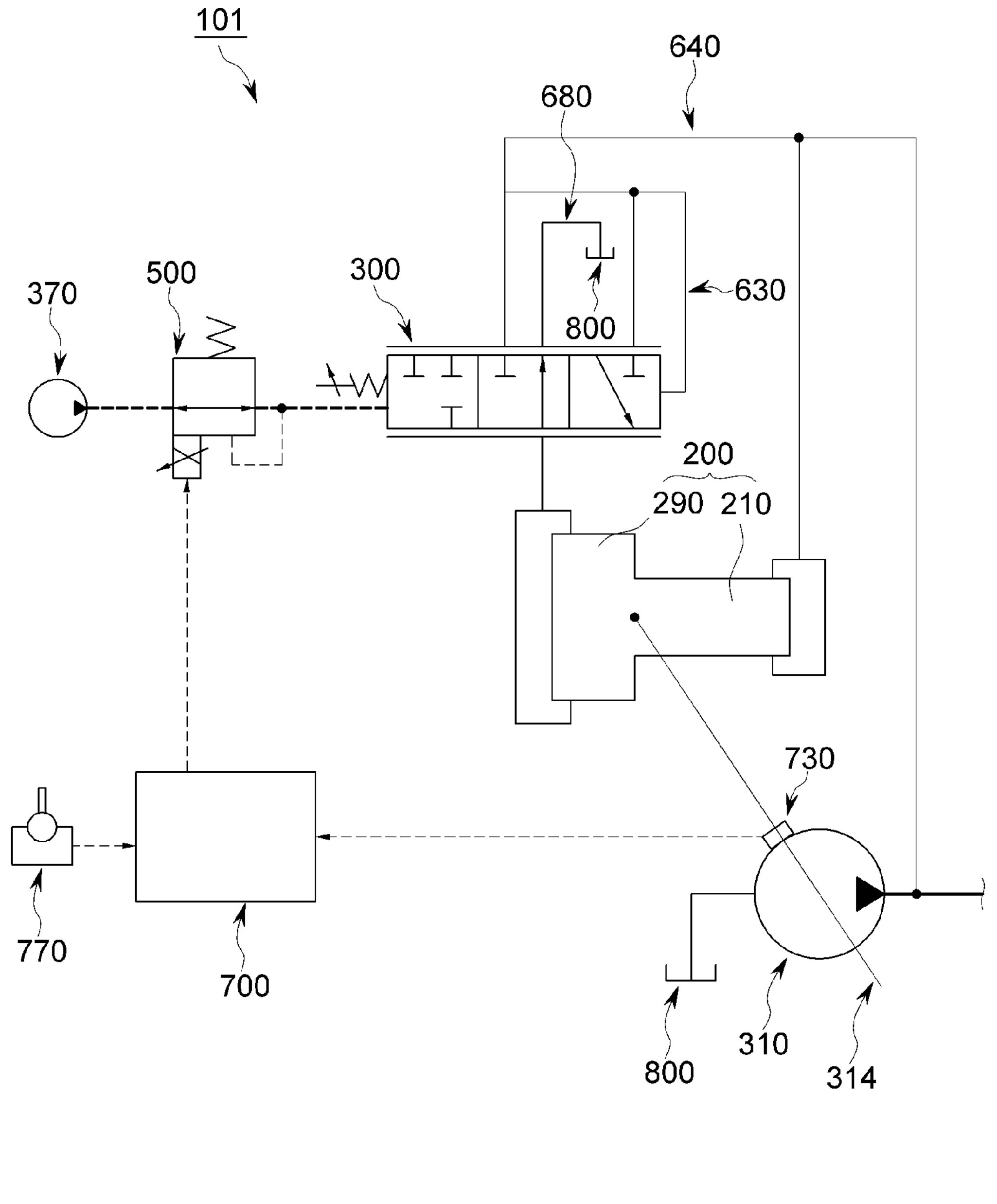
FIG. 1 is a hydraulic circuit diagram of a hydraulic system according to an exemplary embodiment of the present disclosure.

Hereinafter, exemplary embodiments of the present disclosure will be described in detail with reference to the accompanying drawings so that one skilled in the art to which the present disclosure belongs can easily implement the same. The present disclosure may be implemented in various different forms, and is not limited to the exemplary embodiments described herein.

It should be noted that the drawings are schematic and not drawn to scale. The relative dimensions and ratios of parts in the drawings are shown exaggerated or reduced in size for clarity and convenience in the drawings, and any dimension is merely exemplary and not limiting. In addition, the same reference numerals are used to denote similar features in the same structures, elements, or components shown in two or more drawings.

The exemplary embodiments of the present disclosure specifically show preferred exemplary embodiments. As a result, various modifications of the drawings are anticipated. Therefore, the exemplary embodiments are not limited to a specific form of an illustrated region, and include, for example, modifications of a manufactured form.

Hereinafter, a hydraulic system 101 according to an exemplary embodiment of the present disclosure will be described with reference to FIGS. 1 to 3. The hydraulic system 101 according to the exemplary embodiment of the present disclosure may be used in construction machinery, industrial vehicles, or the like, and may drive various drive devices such as a boom cylinder, an arm cylinder, a bucket cylinder, a slewing motor, and a travel motor through hydraulic oil discharged from a hydraulic pump 310 that is driven by an engine.

Figure 2:
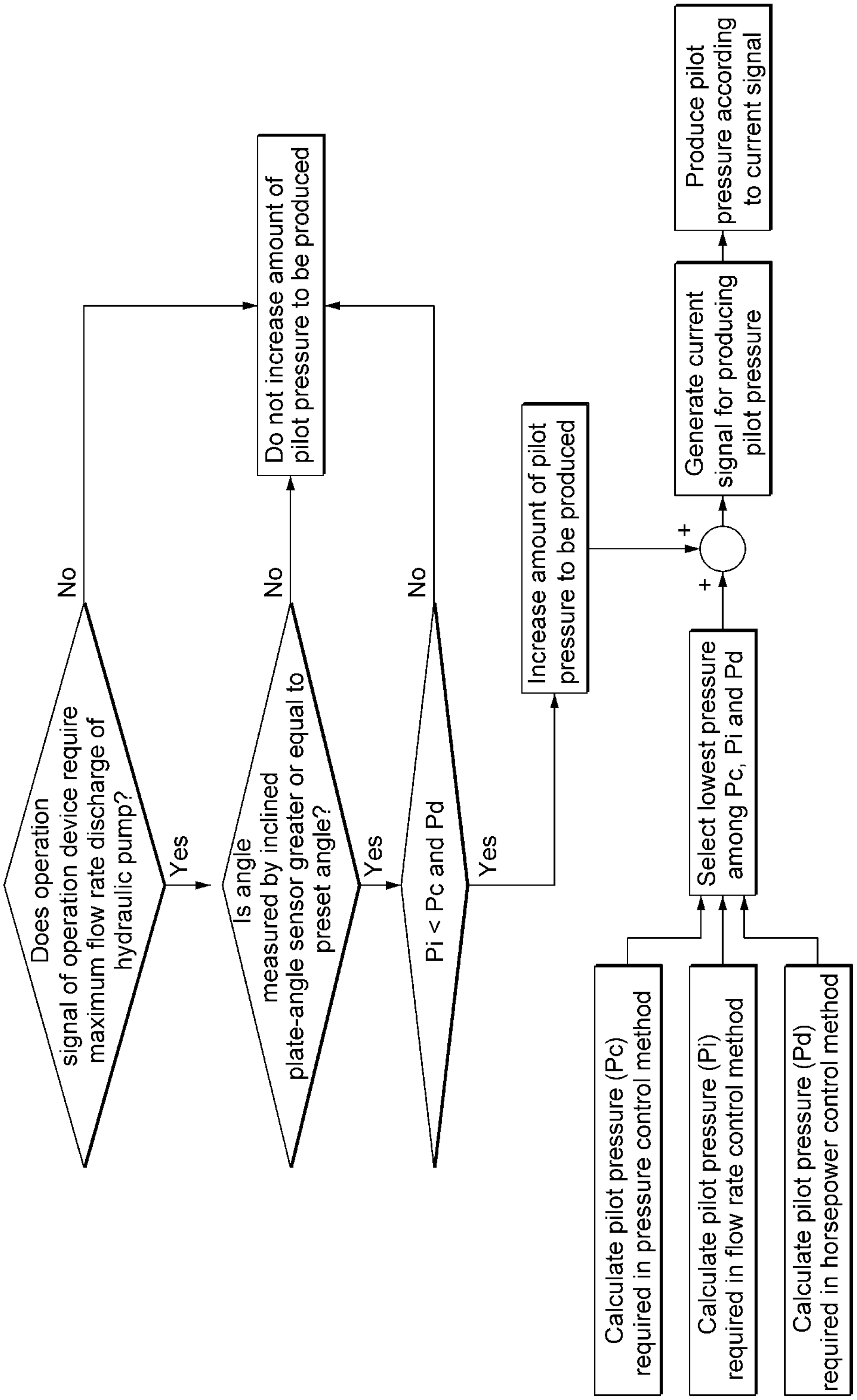
FIG. 2 is a flowchart showing a control process of a control device of the hydraulic system of FIG. 1.

As shown in FIG. 1, the hydraulic system 101 according to the exemplary embodiment of the present disclosure includes a hydraulic pump 310, a swash plate angle sensor 730, a swash plate drive piston 200, a swash plate control hydraulic line 640, a control valve 300, an electronic proportional pressure reducing valve 500, an operation device 770, and a control device 700.

In addition, the hydraulic system 101 according to the exemplary embodiment of the present disclosure may further include a drain line 680, a valve control hydraulic line 630, a pilot pump 370, and an oil tank 800.

The hydraulic pump 310 is a swash plate type variable displacement pump. That is, the hydraulic pump 310 includes a swash plate 314. A discharge flow rate of the hydraulic pump 310 can be adjusted by adjusting an angle of the swash plate 314.

The swash plate angle sensor 730 measures an angle of the swash plate 314. Since the angle of the swash plate 314 is proportional to a discharge flow rate of the hydraulic oil of the hydraulic pump 310, the swash plate angle sensor 730 can measure a discharge flow rate of the hydraulic oil of the hydraulic pump 310.

The swash plate drive piston 200 adjusts an angle of the swash plate 314 of the hydraulic pump 310. The swash plate drive piston 200 has a large diameter section 290 and a small diameter section 210, and moves the swash plate 314 of the hydraulic pump 310 in response to a change in pressure applied to the large diameter section 290.

The swash plate control hydraulic line 640 is provided to supply a portion of the hydraulic oil discharged by the hydraulic pump 310 to the large diameter section 290 of the swash plate drive piston 200.

The control valve 300 is installed on the swash plate control hydraulic line 640 to control a flow rate of the hydraulic oil supplied to the large diameter section 290 of the swash plate drive piston 200 or discharged from the large diameter section 290 of the swash plate drive piston 200. Specifically, the control valve 300 changes an internal flow path as a position of a spool is switched, and accordingly, supplies the hydraulic oil moving through the swash plate control hydraulic line 640 to the large diameter section 290 of the swash plate drive piston 200 or drains the hydraulic oil discharged from the large diameter section 290 of the swash plate drive piston 200 through a drain line 680 described later.

The electronic proportional pressure reducing valve (EP-PRV) 500 generates pilot pressure that is to be delivered to one side of the control valve 300. The electronic proportional pressure reducing valve 500 is an electronic control valve and generates pilot pressure according to a current signal supplied by the control device 700 described later. That is, the electronic proportional pressure reducing valve 500 can adjust a magnitude of the pilot pressure that is generated in proportion to a magnitude of a current signal provided by the control device 700.

The pilot pump 370 is used to generate the pilot pressure. That is, the pressure of the hydraulic oil discharged by the pilot pump 370 is processed into pilot pressure to be delivered to the control valve 300 by the electronic proportional pressure reducing valve 500.

The valve control hydraulic line 630 is branched from the swash plate control hydraulic line 640 upstream of the control valve 300 and can deliver pressure to the other side of the control valve 300. Here, the 'upstream' is determined based on the flow of hydraulic oil and refers to a direction of the hydraulic pump 310 at the control valve 300. That is, a pressure of the hydraulic oil discharged from the hydraulic pump 310 is applied to the other side of the control valve 300. In this case, the pressure of the hydraulic oil that is delivered to the other side of the control valve 300 may be processed depending on cases.

The drain line 680 is connected to the control valve 300. As the spool of the control valve 300 is switched, the hydraulic oil delivered to the control valve 300 and the hydraulic oil discharged from the large diameter section 290 of the swash plate drive piston 200 may be drained through the drain line 680.

The oil tank 800 is connected to the drain line 680 and can store the hydraulic oil drained through the drain line 680. In addition, the hydraulic pump 310 may discharge the hydraulic oil stored in the oil tank 800.

The operation device 770 generates an operation signal. For example, the operation device 770 may include a joystick, an operation lever, a pedal, a touch screen, a button and the like installed in a cabin so that an operator can operate various drive devices. The operation device 770 is operated by a user, and the control device 700, which will be described later, generates a current signal according to the operation signal from the operation device 770 and transmits the same to the electronic proportional pressure reducing valve 500.

The control device 700 controls the electronic proportional pressure reducing valve 500 according to the operation signal from the operation device 770 and the angle information from the swash plate angle sensor 730. That is, the electronic proportional pressure reducing valve 500 generates pilot pressure according to the current signal received from the control device 700.

In this way, the pilot pressure generated by the electronic proportional pressure reducing valve 500 is transmitted to the control valve 300 under control of the control device 700, and the control valve 300 operates according to the received pilot pressure, thereby controlling an operation of the swash plate drive piston 200. The angle of the swash plate 314 of the hydraulic pump 310 is adjusted according to the operation of the swash plate drive piston 200, so that the discharge flow rate of the hydraulic pump 310 is controlled.

For example, the pilot pressure generated by the electronic proportional pressure reducing valve 500 under control of the control device 700 and transmitted to one side of the control valve 300 may be divided into a first pilot pressure, a second pilot pressure, and a third pilot pressure.

The first pilot pressure is a pressure lower than the pressure that is applied to the other side of the control valve 300 through the valve control hydraulic line 640. Therefore, when the first pilot pressure is applied to one side of the control valve 300, the control valve 300 supplies the hydraulic oil to the large diameter section 290 of the swash plate drive piston 200 through the swash plate control hydraulic line 640. When the hydraulic oil is supplied to the large diameter section 290 of the swash plate drive piston 200, the angle of the swash plate 314 of the hydraulic pump 310 is reduced to reduce the discharge flow rate of the hydraulic pump 310.

The second pilot pressure is a pressure higher than the pressure that is applied to the other side of the control valve 300 through the valve control hydraulic line 640. Therefore, when the second pilot pressure is applied to one side of the control valve 300, the internal flow path is changed as the position of the spool of the control valve 300 is switched, so that the control valve 300 causes the hydraulic oil of the large diameter section 290 of the swash plate drive piston 200 to be drained to the drain line 680. When the hydraulic oil is drained from the large diameter section 290 of the swash plate drive piston 200, the angle of the swash plate 314 of the hydraulic pump 310 is increased to increase the discharge flow rate of the hydraulic pump 310.

The third pilot pressure is a pressure higher than the second pilot pressure. When the third pilot pressure is applied to one side of the control valve 300, the position of the spool of the control valve 300 is switched once more to cut off the draining of the hydraulic oil from the control valve 300 to the drain line 680. When the draining of the hydraulic oil from the control valve 300 is cut off in this way, a portion of the hydraulic oil discharged from the hydraulic pump 310 no longer moves along the swash plate control hydraulic line 640, so that all of the hydraulic oil discharged from the hydraulic pump 310 can be used to drive the drive device. That is, the hydraulic oil discharged from the hydraulic pump 310 can be prevented from being drained and discarded via the control valve 300 unnecessarily.

Meanwhile, when the first pilot pressure and the second pilot pressure are applied to one side of the control valve 300, at least a portion of the hydraulic oil discharged from the hydraulic pump 310 and delivered to the control valve 300 through the swash plate control hydraulic line 640 and the valve control hydraulic line 630 is drained through the drain line 680. The draining of the hydraulic oil from the control valve 300 is for the control valve 300 to stably perform a control operation. The control valve 300 changes the flow path while switching the internal spool by using the pressure of the hydraulic oil.

Therefore, when the hydraulic pump 310 does not need to discharge the hydraulic oil at the maximum flow rate and the discharge flow rate continues to vary according to the operation of the operation device 770, the electronic proportional pressure reducing valve 500 generates a pilot pressure lower than the third pilot pressure according to the current signal transmitted by the control device 700, and the control valve 300 operates the swash plate drive piston 200 according to a magnitude of the applied pilot pressure to increase or decrease the discharge flow rate of hydraulic oil of the hydraulic pump 310.

Figure 3:
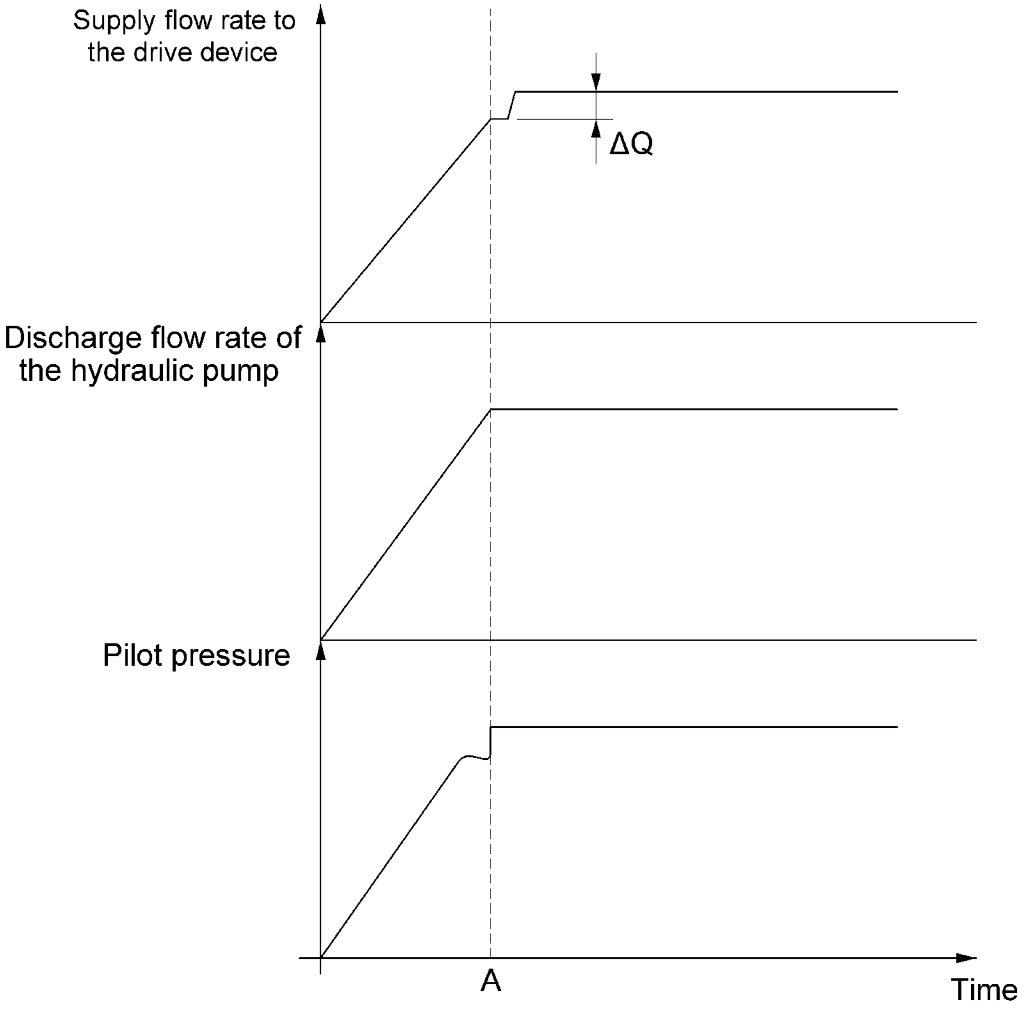
FIG. 3 is graphs showing changes in pilot pressure and discharge flow rate according to an operation of the hydraulic system according to the exemplary embodiment of the present disclosure.

In addition, the control device 700 may control the control valve 300 by a control method selected among a flow rate control method, a horsepower control method, and a pressure control method, as shown in FIG. 3.

In the flow rate control method, the control device 700 feeds back information from the swash plate angle sensor 730 to calculate a pilot pressure Pi that the electronic proportional pressure reducing valve 500 should generate, in order to cause the hydraulic pump 310 to discharge the hydraulic oil in response to a target discharge flow rate command of the hydraulic pump 310 determined by an operation signal from the operation device 770.

In the horsepower control method, while limiting the horsepower required by the hydraulic pump 310 not to exceed a preset horsepower, the control device 700 feeds back engine rotation speed information from the swash plate angle sensor 730 to calculate a pilot pressure Pd that the electronic proportional pressure reducing valve 500 should generate, in order for a rotation speed of an engine to be restored when the rotation speed of the engine that feeds power to the hydraulic pump 310 falls below a preset rotation speed.

In the pressure control method, the control device 700 limits the discharge pressure of the hydraulic pump 310 not to exceed the maximum pressure set for each operation, and calculates a pilot pressure Pc that the electronic proportional pressure reducing valve 500 should generate as a limited value.

The control device 700 selects the lowest pilot pressure among the three types of pilot pressures (Pi, Pd and Pc) calculated as described above, and controls the electronic proportional pressure reducing valve 500 to generate the selected pilot pressure.

In addition, in an exemplary embodiment of the present disclosure, the control device 700 may control the electronic proportional pressure reducing valve 500 to generate a pilot pressure by adding an additional pilot pressure to a pilot pressure selected under certain condition. As such, the pilot pressure obtained by adding an additional pilot pressure to the selected pilot pressure becomes the third pilot pressure described above.

Specifically, the control device 700 controls the electronic proportional pressure reducing valve 500 to generate the third pilot pressure only when following specific conditions are satisfied, for the stability of the control.

The control device 700 may control the electronic proportional pressure reducing valve 500 to generate the third pilot pressure when the angle of the swash plate 314 measured by the swash plate angle sensor 730 becomes equal to or greater than a preset angle after the second pilot pressure is applied to one side of the control valve 300. Here, the preset angle is an angle close to the maximum angle of the swash plate 314 of the hydraulic pump 310. The preset angle is set a little lower than the maximum angle, considering the stability and allowable threshold of the hydraulic pump 310. For example, the preset angle may have a magnitude greater than 95% of the maximum angle.

In addition, the control device 700 may control the electronic proportional pressure reducing valve 500 to generate the third pilot pressure when the operation signal of the operation device 770 requires the maximum flow rate discharge of the hydraulic pump 310 after the second pilot pressure is applied to one side of the control valve 300 and the hydraulic oil is drained to the maximum extent from the large diameter section 290 of the swash plate drive piston 200.

In addition, the control device 700 may control the electronic proportional pressure reducing valve 500 to generate the third pilot pressure when the pilot pressure Pi required according to the flow rate control method is lower than the pilot pressure Pd required according to the horsepower control method and the pilot pressure Pc required according to the pressure control method.

When all the three conditions are satisfied, or in some cases, when one or more of the above conditions are satisfied, the control device 700 may control the electronic proportional pressure reducing valve 500 to generate the third pilot pressure that is a pressure obtained by adding the additional pilot pressure to the selected pilot pressure.

On the other hand, when all the three conditions are not satisfied, or in some cases, when any one of the conditions is not satisfied, the control device 700 may control the electronic proportional pressure reducing valve 500 to generate the selected pilot pressure as it is.

FIG. 3 shows changes in the flow rate of the hydraulic oil discharged by hydraulic pump 310 and the flow rate of the hydraulic oil discharged and supplied to various drive devices by the hydraulic pump 310, according to the pilot pressure generated by the electronic proportional pressure reducing valve 500 under control of the control device 700, in the hydraulic system 101 according to an exemplary embodiment of the present disclosure.

As shown in FIG. 3, as the pilot pressure delivered to the control valve 300 increases, the swash plate drive piston 200 increases the angle of the swash plate 314 of the hydraulic motor 310, thereby gradually increasing the discharge flow rate of the hydraulic pump 310.

Thereafter, at a time point (A) when the angle of the swash plate 314 is maximized and the discharge flow rate of the hydraulic pump 310 can no longer be increased, if the hydraulic pump 310 is continuously required to discharge the maximum flow rate, the third pilot pressure that is the highest pilot pressure is delivered to the control valve 300, and the position of the spool of the control valve 300 is switched, so that the draining of the hydraulic oil from the control valve 300 is cut off.

Then, since a portion of the hydraulic oil discharged from the hydraulic pump 310 is no longer directed toward the control valve 300, all the hydraulic oil discharged from the hydraulic pump 310 is used to drive the drive device.

In this way, when the flow rate of the hydraulic oil discharged from the hydraulic pump 310 and supplied to the drive device is increased (ΔQ), the effect of substantially improving the performance of the hydraulic pump 310 can be obtained.

With such a configuration, the hydraulic system 101 according to the exemplary embodiment of the present disclosure can minimize unnecessary flow rate loss.

That is, when the hydraulic pump 310 is required to discharge the maximum flow rate, the draining of the hydraulic oil from the control valve 300 is cut off, so that all the hydraulic oil discharged from the hydraulic pump 310 is used to drive the drive device, whereby the performance of the hydraulic pump 310 can be utilized to the maximum extent.

Although the exemplary embodiments of the present disclosure have been described with reference to the accompanying drawings, one skilled in the art to which the present disclosure belongs will be able to understand that the present disclosure can be implemented in other concrete forms without changing the technical idea or essential feature thereof.

Therefore, the exemplary embodiments described above should be understood as exemplary and not limiting in all respects, the scope of the present disclosure is defined by the claims described below, and all changed or modified forms derived from the meaning and scope of the claims and the equivalent concept thereto should be interpreted as being included within the scope of the present disclosure.

DESCRIPTION OF MAIN REFERENCE NUMERALS OF DRAWINGS

101: hydraulic system, 200: swash plate drive piston, 210: small diameter section, 290: large diameter section, 300: control valve, 310: hydraulic pump, 314: swash plate, 370: pilot pump, 500: electronic proportional pressure reducing valve, 630: valve control hydraulic line, 640: swash plate control hydraulic line, 700: control device, 730: swash plate angle sensor, 770: operation device, 800: oil tank

INDUSTRIAL APPLICABILITY

According to the exemplary embodiments of the present disclosure, the hydraulic system can be used to minimize unnecessary flow rate loss.

The invention claimed is:

1. A hydraulic system comprising:

a variable displacement hydraulic pump configured to discharge hydraulic oil and comprising a swash plate;

a swash plate angle sensor configured to measure an angle of the swash plate;

a swash plate drive piston having a large diameter section and a small diameter section and configured to move the swash plate of the hydraulic pump in response to a change in pressure applied to the large diameter section;

a swash plate control hydraulic line for supplying a portion of the hydraulic oil discharged by the hydraulic pump to the large diameter section;

a control valve installed on the swash plate control hydraulic line to control a flow rate of the hydraulic oil supplied to or discharged from the large diameter section;

an electronic proportional pressure reducing valve configured to generate pilot pressure that is to be delivered to one side of the control valve;

an operation device configured to generate an operation signal;

a control device configured to control the electronic proportional pressure reducing valve according to the operation signal from the operation device and angle information from the swash plate angle sensor;

a drain line connected to the control valve; and a valve control hydraulic line branched from the swash plate control hydraulic line upstream of the control valve and provided to deliver pressure to the other side of the control valve, wherein the pilot pressure generated by the electronic proportional pressure reducing valve under control of the control device and delivered to one side of the control valve comprises:

a first pilot pressure lower than the pressure applied to the other side of the control valve through the valve control hydraulic line, a second pilot pressure higher than the pressure applied to the other side of the control valve through the valve control hydraulic line, and a third pilot pressure higher than the second pilot pressure.

2. The hydraulic system of claim 1, wherein when the first pilot pressure is applied to one side of the control valve, the control valve is configured to supply the hydraulic oil to the large diameter section of the swash plate drive piston through the swash plate control hydraulic line, wherein when the second pilot pressure is applied to one side of the control valve, the control valve is configured to drain the hydraulic oil of the large diameter section of the swash plate drive piston to the drain line, and wherein when the third pilot pressure is applied to one side of the control valve, the draining of the hydraulic oil from the control valve to the drain line is cut off.

3. The hydraulic system of claim 2, wherein when the first pilot pressure and the second pilot pressure are applied to one side of the control valve, at least a portion of the hydraulic oil discharged from the hydraulic pump and delivered to the control valve through the swash plate control hydraulic line and the valve control hydraulic line is drained through the drain line.

4. The hydraulic system of claim 2, wherein when the hydraulic oil is supplied to the large diameter section of the swash plate drive piston, the angle of the swash plate of the hydraulic pump is reduced to reduce the discharge flow rate of the hydraulic pump, and wherein when the hydraulic oil is drained from the large diameter section of the swash plate drive piston, the angle of the swash plate of the hydraulic pump is increased to increase the discharge flow rate of the hydraulic pump.

5. The hydraulic system of claim 2, wherein the control device is configured to control the electronic proportional pressure reducing valve to generate the third pilot pressure when the angle of the swash plate measured by the swash plate angle sensor becomes equal to or greater than a preset angle after the second pilot pressure is applied to one side of the control valve.

6. The hydraulic system of claim 2, wherein the control device is configured to control the electronic proportional pressure reducing valve to generate the third pilot pressure when the operation signal of the operation device requests the maximum flow rate discharge of the hydraulic pump after the second pilot pressure is applied to one side of the control valve and the hydraulic oil is drained to the maximum extent from the large diameter section of the swash plate drive piston.

7. The hydraulic system of claim 5, wherein the control device is configured:

to calculate the pilot pressure required according to a flow rate control method, the pilot pressure required according to a horsepower control method, and the pilot pressure required according to a pressure control method, respectively, and to select the lowest pilot pressure among the calculated pilot pressures and to control the electronic proportional pressure reducing valve to generate the selected pilot pressure.

8. The hydraulic system of claim 7, wherein the control device is configured to control the electronic proportional pressure reducing valve to generate the third pilot pressure when the pilot pressure required according to the flow rate control method is lower than the pilot pressure required according to the horsepower control method and the pilot pressure required according to the pressure control method.

9. The hydraulic system of claim 6, wherein the control device is configured:

to calculate the pilot pressure required according to a flow rate control method, the pilot pressure required according to a horsepower control method, and the pilot pressure required according to a pressure control method, respectively, and to select the lowest pilot pressure among the calculated pilot pressures and to control the electronic proportional pressure reducing valve to generate the selected pilot pressure.

10. The hydraulic system of claim 9, wherein the control device is configured to control the electronic proportional pressure reducing valve to generate the third pilot pressure when the pilot pressure required according to the flow rate control method is lower than the pilot pressure required according to the horsepower control method and the pilot pressure required according to the pressure control method.

* * * * *